(12) United States Patent
Belser et al.

(10) Patent No.: US 8,781,441 B1
(45) Date of Patent: *Jul. 15, 2014

(54) DECISION ENVIRONMENT FOR DEVICES THAT FAIL AUTHENTICATION

(75) Inventors: John Belser, Olathe, KS (US); Tim Swan, Lee's Summit, MO (US); Jeremy Breau, Kansas City, MO (US); David McKinney, Olathe, KS (US)

(73) Assignee: Sprint Communications Company L.P., Overland Park, KS (US)

(*) Notice: Subject to any disclaimer, the term of this patent is extended or adjusted under 35 U.S.C. 154(b) by 1357 days.

This patent is subject to a terminal disclaimer.

(21) Appl. No.: 11/672,823

(22) Filed: Feb. 8, 2007

(51) Int. Cl.
*H04M 1/66* (2006.01)
(52) U.S. Cl.
USPC ............................ 455/411; 726/2; 380/247
(58) Field of Classification Search
USPC ............ 370/338; 455/410–411, 558, 455/435.1–436; 713/168–176; 726/2–7, 12; 380/247
See application file for complete search history.

(56) References Cited

U.S. PATENT DOCUMENTS

| | | | | |
|---|---|---|---|---|
| 6,236,852 B1* | 5/2001 | Veerasamy et al. | ........... | 455/411 |
| 6,397,056 B1* | 5/2002 | Bugnon et al. | ............... | 455/411 |
| 7,444,511 B2* | 10/2008 | Morimoto | ..................... | 713/168 |
| 7,555,783 B2* | 6/2009 | Enright | .......................... | 726/27 |
| 7,788,480 B2* | 8/2010 | Winget et al. | ................. | 713/150 |
| 7,813,721 B2* | 10/2010 | Kim | ............. | 455/414.1 |
| 2001/0025345 A1* | 9/2001 | Jung et al. | ..................... | 713/200 |
| 2003/0076940 A1* | 4/2003 | Manto | ..................... | 379/114.05 |
| 2005/0239447 A1* | 10/2005 | Holzman et al. | ........... | 455/414.3 |
| 2008/0022356 A1* | 1/2008 | Tanaka et al. | ..................... | 726/1 |
| 2008/0108322 A1* | 5/2008 | Upp | .............................. | 455/411 |

* cited by examiner

*Primary Examiner* — George Eng
*Assistant Examiner* — Marcus Hammonds

(57) ABSTRACT

A system, a method and computer-readable media for handling a device that experiences a failure to complete a network's authentication process. Causes of the failure are determined, and device attributes are received. These causes and attributes are then used to determine an alternative authentication process. The device is authenticated by using this alternative authentication process.

10 Claims, 12 Drawing Sheets

DECISION ENVIRONMENT FOR DEVICES THAT FAIL AUTHENTICATION

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

Recent developments in wireless telecommunications have ushered in a new era of mobility. The advent of cellular and personal communications services has enabled people to maintain communication from virtually any location. Further, advanced technology has facilitated not only wireless voice communication but also wireless data communication, such as the ability to communicate over computer networks and to send and receive data and other content.

Wireless communications systems have existed for many years. In general, a wireless communications system uses mobile or fixed radios that communicate with a fixed radio tower that is in turn interconnected to a larger telecommunications network. Such systems can take a variety of forms. For example, traditional cellular communications systems provide radio coverage to a wide area, such as a city, through use of many radio towers. Typically, subscribers to wireless service are equipped with one or more wireless terminals or "client devices," which may take any of a variety of forms. By way of example, a wireless client device may be a telephone, a pager, a computer, a personal digital assistant ("PDA") or any combination of these or other devices. A wireless client device may be configured to receive and/or convey information such as voice and data (e.g., fax, e-mail and other text messages) and/or other media (e.g., audio, video and graphics). Further, the client device may include input and output facilities such as a touch-pad, a keyboard, a camera, a display, a microphone and/or a speaker. Some client devices are equipped with web browsing software to allow subscribers to communicate with web servers over an Internet Protocol (IP) network (i.e., the Internet).

Wireless networks and mobile wireless devices may use a number of channels to transmit and receive information, and a properly equipped wireless device can initiate communications by sending an initiation request message over one of these channels. Applying industry standards, the initiation request message may include a code that characterizes the requested communication as packet-data communication, as compared with traditional voice communication.

With the rapid growth in the area of wireless communications, a variety of different access technologies has emerged. For example, Code Division Multiple Access (CDMA) is a packet-based wireless-access technology that may be used in certain cellular phone systems. As another example, Wi-Fi is an access technology based on a series of specifications from the Institute of Electrical and Electronics Engineers (IEEE) called 802.11. Wi-Fi uses radio frequency and enables a wireless-enabled computer or PDA to connect to the Internet via a wireless access point. Yet another access technology being utilized today is commonly referred to as WiMax (Worldwide Interoperability for Microwave Access). WiMax, also known as the IEEE 802.16 group of standards, defines a packet-based wireless technology that provides high-throughput broadband connections over long distances.

Regardless of the access technologies in use, wireless network providers today require client devices to successfully negotiate strict authentication and access procedures before a device is granted network access. With these strict procedures, any failure during the authentication process will prevent the device from connecting to the network. A failure to complete network access and authentication, however, may not necessarily mean the user should be denied network access. While failures may occur for numerous different reasons, authentication services today do not evaluate the reason for a failed authentication or provide flexibility during the authentication process. As such, a failed authentication may lead to the loss of a potential wireless customer and/or the loss of revenue from a user session. Accordingly, there is a need for improved authentication and access procedures that provides secure, controlled and revenue generating connectivity to as many mobile devices as possible, including to devices that initially fail to properly connect to the network.

SUMMARY

The present invention provides systems and methods for handling a device that experiences a failure to complete a network's authentication process. In one aspect of an embodiment of the present invention, a computer-implemented method is provided. Causes of the failure are determined, and device attributes are received. These causes and attributes are then used to determine an alternative authentication process. The device is authenticated by using this alternative authentication process.

In another aspect of an embodiment of the present invention, a system is provided for handling devices that experience failures during an authentication process. A failure handling component receives device attributes associated with the devices. A treatment determination component utilizes these device attributes to select a portion of the devices for handling by an account activation component or for handling by a revenue assignment component. The account activation component provisions the devices with parameters used during the authentication process, while the revenue assignment component identifies entities to be billed for network usage associated with the devices.

In yet another aspect of an embodiment of the present invention, a method is provided for handling devices that fail to complete an authentication process. Identification information from the devices is used to search a data store for device attributes. These device attributes are used to identify which of the devices are capable of being provisioned with authentication parameters. For devices identified as capable of being provisioned, the method provides these devices authentication parameters. For the devices not capable of being provisioned, the method identifies entities to be billed for network usage associated with such devices.

It should be noted that this Summary is provided to generally introduce the reader to one or more select concepts described below in the Detailed Description in a simplified form. This Summary is not intended to identify key and/or required features of the claimed subject matter, nor is it intended to be used as an aid in determining the scope of the claimed subject matter.

BRIEF DESCRIPTION OF THE SEVERAL VIEWS OF THE DRAWING

The present invention is described in detail below with reference to the attached drawing figures, wherein.

DETAILED DESCRIPTION

Figure 1:
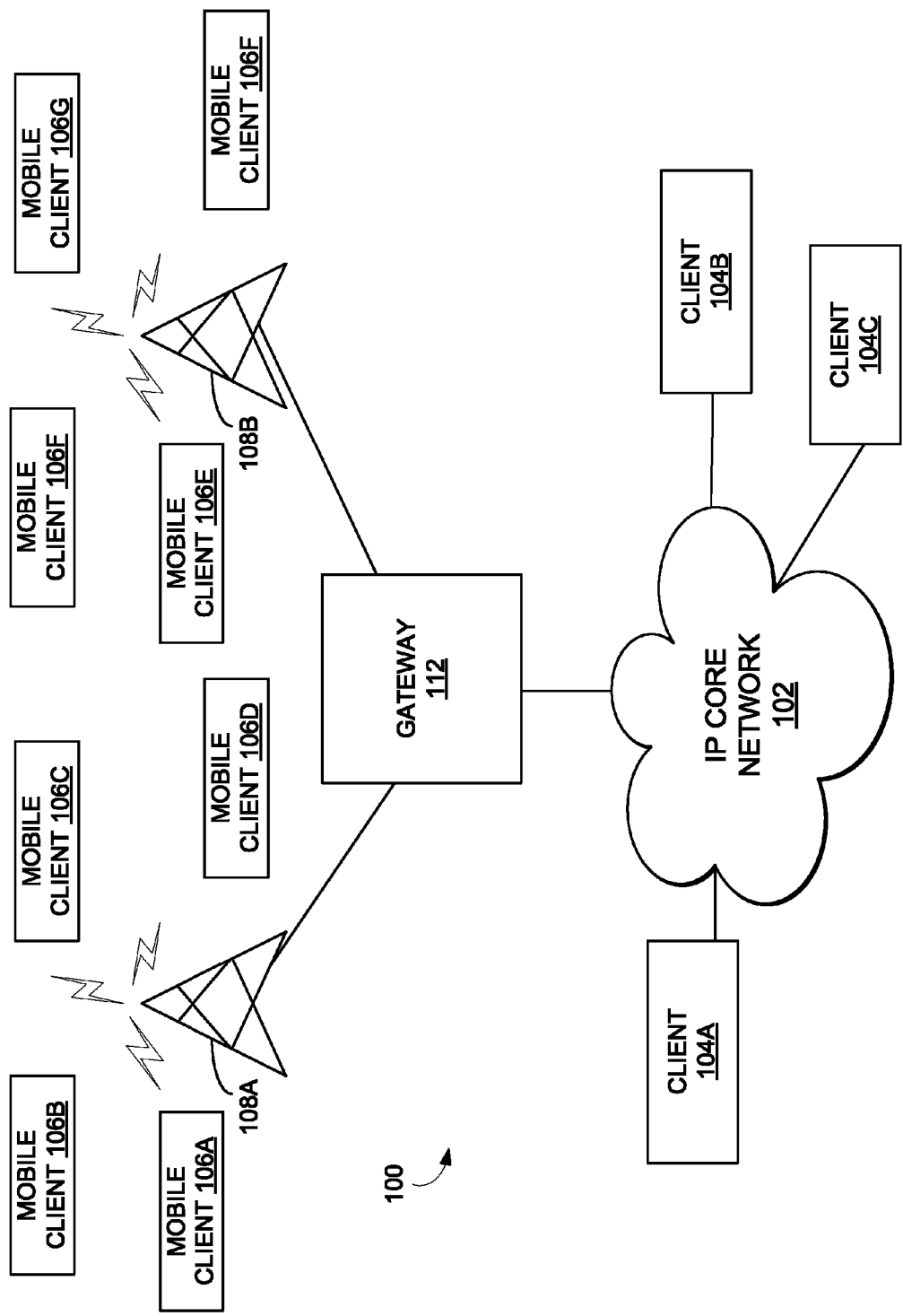
FIG. 1 is a block diagram of a network environment suitable for use in implementing the present invention.

The subject matter of the present invention is described with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the term "step" may be used herein to connote different elements of methods employed, the term should not be interpreted as implying any particular order among or between various steps herein disclosed unless and except when the order of individual steps is explicitly described. Further, the present invention is described in detail below with reference to the attached drawing figures, which are incorporated in their entirety by reference herein.

The present invention provides an improved system and method for handling access/authentication failures. The invention may be described in the general context of computer-executable instructions, such as program modules, being executed by a computer. Generally, program modules include routines, programs, objects, components, data structures, etc., that perform particular tasks or implement particular abstract data types. Moreover, those skilled in the art will appreciate that the invention may be practiced with a variety of computer-system configurations, including multiprocessor systems, microprocessor-based or programmable-consumer electronics, minicomputers, mainframe computers, and the like. Any number of computer-systems and computer networks are acceptable for use with the present invention.

Specific hardware devices, programming languages, components, processes, and numerous details including operating environments and the like are set forth to provide a thorough understanding of the present invention. In other instances, structures, devices, and processes are shown in block-diagram form, rather than in detail, to avoid obscuring the present invention. But an ordinary-skilled artisan would understand that the present invention may be practiced without these specific details. Computer systems, servers, work stations, and other machines may be connected to one another across a communication medium including, for example, a network or networks.

The invention may be practiced in distributed-computing environments where tasks are performed by remote-processing devices that are linked through a communications network. In a distributed-computing environment, program modules may be located in both local and remote computer-storage media including memory storage devices. The computer-useable instructions form an interface to allow a computer to react according to a source of input. The instructions cooperate with other code segments to initiate a variety of tasks in response to data received in conjunction with the source of the received data. Computer-readable media include both volatile and nonvolatile media, removable and nonremovable media, and contemplates media readable by a database, a switch, and various other network devices. Network switches, routers, and related components are conventional in nature, as are means of communicating with the same. By way of example, and not limitation, computer-readable media comprise computer-storage media and communications media.

The present invention may be embodied as, among other things: a method, system, computer-program product, or combinations thereof. Accordingly, the present invention may take the form of a hardware embodiment, a software embodiment, or an embodiment combining software and hardware. In one embodiment, the present invention takes the form of a computer-program product that includes computer-useable instructions embodied on one or more computer-readable media.

The present invention may be practiced in any network environment such as a communications network. Such networks are widely used to connect various types of network elements, such as routers, servers, gateways, network telephones, and so forth. Further, the invention may be practiced in a multi-network environment having various, connected public and/or private networks. The networks may be wireless or wireline ("wired"). As will be appreciated by those skilled in the art, communication networks may take several of different forms and may use several different communication protocols.

FIG. 1 illustrates a network environment 100 that represents an exemplary environment in which the present invention may be practiced. It is important to note that network environments in which the present invention may operate may be arranged in a variety of configurations, and the network environment 100 of FIG. 1 provides only one exemplary network environment.

The network environment 100 includes an IP core network 102. The network 102 may be any network or combination of networks configured to provide communications between network devices. The network 102 provides communication services for clients 104A-104C. The clients 104A-104C may be any computing devices connected to the network 102, and each of the clients 104A-104C may have an address, such as an Internet protocol (IP) address, for uniquely identifying that client. The clients 104A-104C may interact with the network 102 to receive a variety of content such as voice, data or video.

The network environment 100 may also include a wireless communication system configured to provide communication services to mobile clients 106A-106F. In an exemplary wireless communication system, each mobile client 106A-106F may communicate via an air interface with a base transceiver station 108A or a base transceiver station 108B. The base transceiver stations 108A and 108B may be coupled to any number of different devices that enable connectivity with the network 102, the public Internet and/or a private intranet (e.g., a wireless carrier's core network). The base transceiver stations 108A and 108B may utilize any number of wireless access technologies or standards known in the art to communicate with the mobile clients 106A-106F.

In order to facilitate communication sessions originating from the mobile clients 106A-106F, the network environment 100 includes a gateway 112. As known to those skilled in the art, the gateway 112 may provide a variety of functions allowing clients to communicate with the IP core network 102. Such functions may vary based on the type of access technology being utilized by an originating client device. The gateway 112 may receive communication requests from the mobile clients 106A-106F, authenticate the clients and assign IP addresses.

Figure 2A:
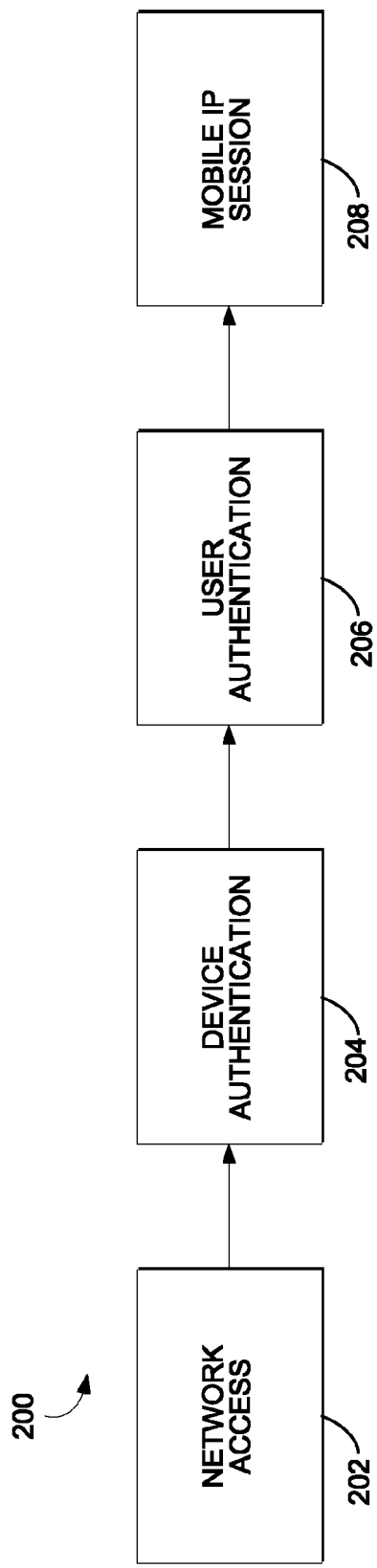
FIGS. 2A and 2B illustrate a method in accordance with one embodiment of the present invention for handling access/authentication failures.
Figure 2B:
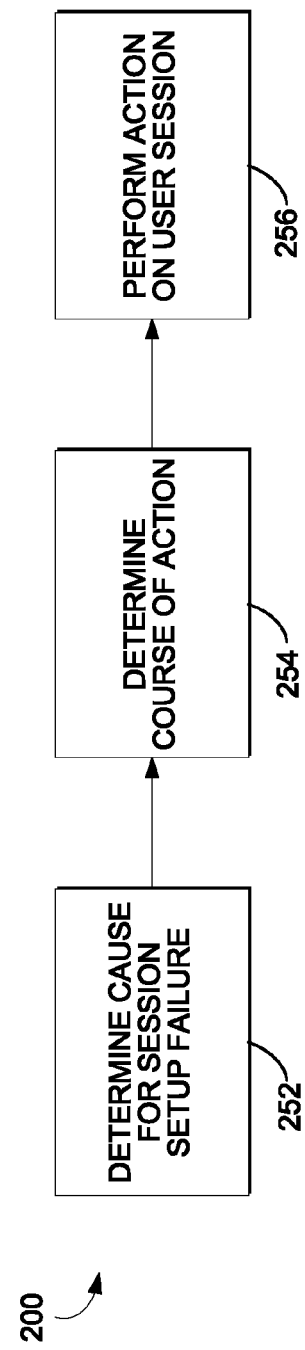

FIG. 2 illustrates a method 200 for handling access/authentication failures. The method 200 includes steps 202, 204, 206 and 208. These steps represent a process for network authentication in which a Mobile IP session is initiated. When a client device is turned on or enters an area with wireless network coverage, the device may attempt to access the wireless network by communicating with a local base station. It should be noted that the client device may be one of any number of devices capable of communicating wirelessly over an air interface, and the device may include applications that run on the device. For example, the applications may include a browsing application, such as a Wireless Application Protocol (WAP) browser. When initiated, the browser may receive content from a host device via the Internet (or other IP network).

To receive such content, the device must first be granted access to the network by successfully completing the steps 202, 204, 206 and 208. The step 202 relates to network access, i.e., establishing a communication link between the device and the network. This step typically involves ensuring that the device has the proper hardware to communicate with the network, as well as authenticating/validating the device's identification information. Once the device has established a link to the network, the device and the user must be authenticated at the steps 204 and 206. In one embodiment, the device and the network engage in signaling in accordance with the Extensible Authentication Protocol (EAP). As known to those skilled in the art, EAP is a universal authentication framework that provides some common functions and for negotiation of a desired authentication mechanism. Such mechanisms are called EAP methods, and there are currently about 40 different EAP methods in existence. Generally, the network will propose one or more EAP methods to be used to authenticate the device and/or the user. If the device supports the proposed method, the authentication process may proceed. Once the device and the user are authenticated, a Mobile IP session is established at the step 208. With this connectivity, the device may access and interact with the network and other networked devices.

While the steps 202, 204, 206 and 208 represent the preferred steps of an authentication process, the steps 252, 254 and 256 represent the steps taken by the method 200 in the event of an access/authentication failure. For example, if the device fails the device authentication at the step 204, the method 200 seeks to determine the cause of the failure at the step 252. Once the cause is established, a course of action may be determined at the step 254. As will be explained in greater detail, this course of action may involve gathering more information about the client device and assessing the device's capabilities. At the step 256, actions are performed with respect to the client device, as dictated by the course of action determined at the step 254. These actions may, for example, involve passing activation parameters to the device and/or locating a source of revenue to be associated with the device's IP sessions. So, instead of simply denying a device access when it fails to authenticate, the method 200 provides a "safety net" that attempts to diagnose the reasons for a failure and to take actions that provide at least some network access to the device.

Figure 3:
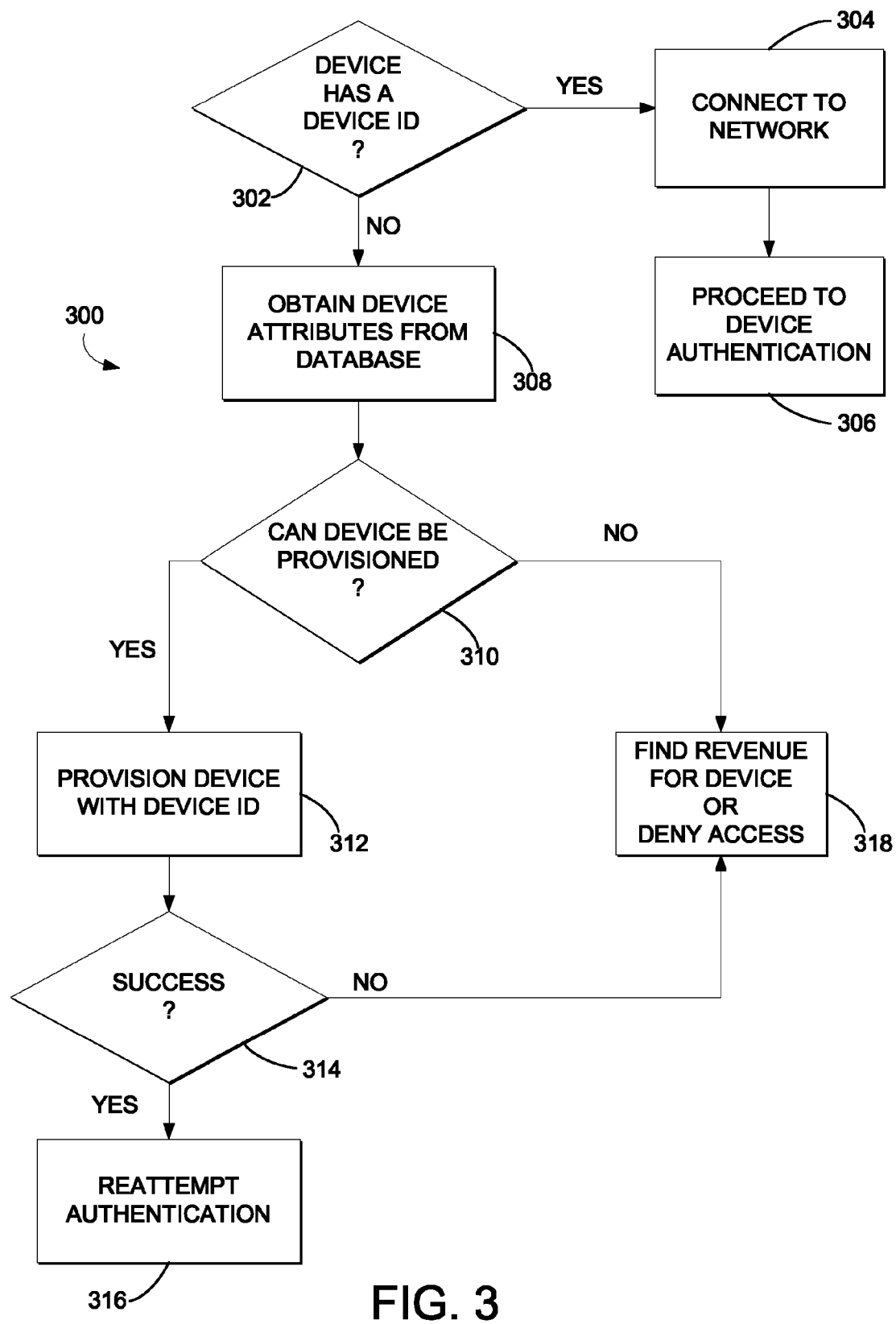
FIG. 3 illustrates a method in accordance with one embodiment of the present invention for handling a device's failure to connect to a network.

FIG. 3 illustrates a method 300 in accordance with one embodiment of the present invention for handling a device's failure to connect to the network. For example, a device may fail to provide a valid or authorized Media Access Control address (MAC address). Unless the provided MAC address has been blacklisted, the method 300, at a step 302, determines whether the device has a device ID (e.g., an Network Access Identifier (NAI)). If such an ID is present, the method 300 allows the device to connect to the network at a step 304. In one embodiment, an access control, policy enforcement and auditing framework may be utilized at the step 304 in connection with the grant of network connectivity. At a step 306, the device may proceed to device authentication.

In event the device does not have a device ID, device attributes are obtained from a database based on the MAC address at a step 308. In one embodiment, a global registry of devices may be maintained. Using a device ID and/or MAC address, this registry may allow various device capability parameters to be obtained. For example, the registry may store parameters such as the device's make, model, EAP capabilities, credentials and provisioning capabilities. Further, the registry may indicate whether the device supports audio or video advertisement pushes and/or HTTP/HTTPS.

Using the received device attributes, the method 300, at a step 310, determines whether the device can be provisioned with a device ID. If so, the device is provisioned with an ID (e.g., MAC@networkprovider.com) at a step 312. A determination is made at a step 314 whether the provisioning was successful. If so, at a step 316, the device is directed to reattempt authentication using the new device ID.

In the that event the device could not be provisioned or that the provisioning failed, the method 300, at a step 318, attempts to find a source of revenue to be associated with the device's network usage. For example, a bill-back agreement may exist between the device vender and the network service provider. Under such an agreement, the vender may be billed for the network usage costs. Alternately, the device may support advertisement pushes. In this case, the advertisers will pay for the device's network access. As another example, if the device is HTTP or WAP capable, the user may be pushed to a portal in which the user can enter payment information, such as a credit card number. Those skilled in the art will appreciate that any number of revenue sources may be associated with a user's session.

Figure 4A:
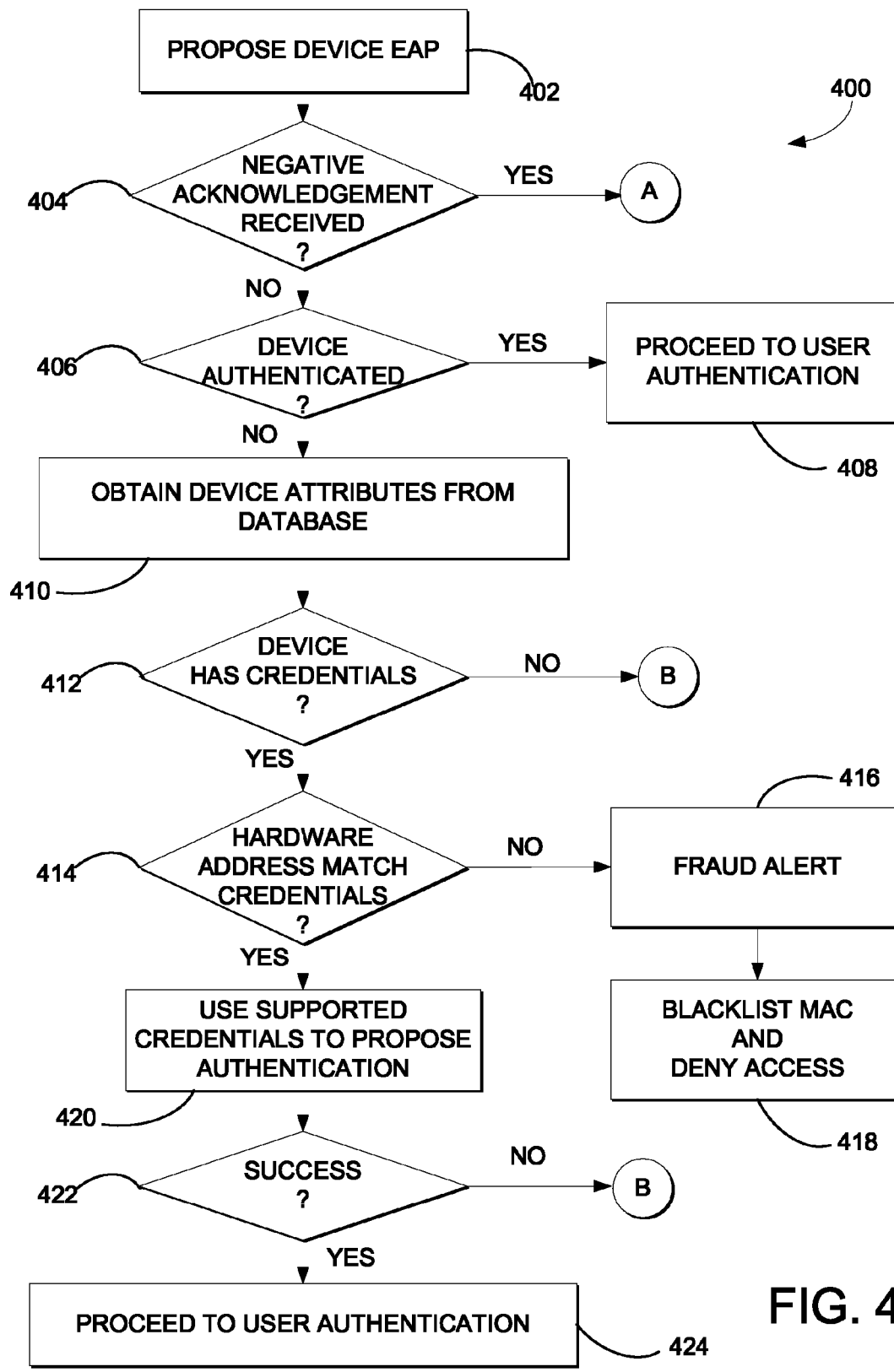
FIGS. 4A-4C illustrate a method in accordance with one embodiment of the present invention for handling the authentication of a mobile device.
Figure 4B:
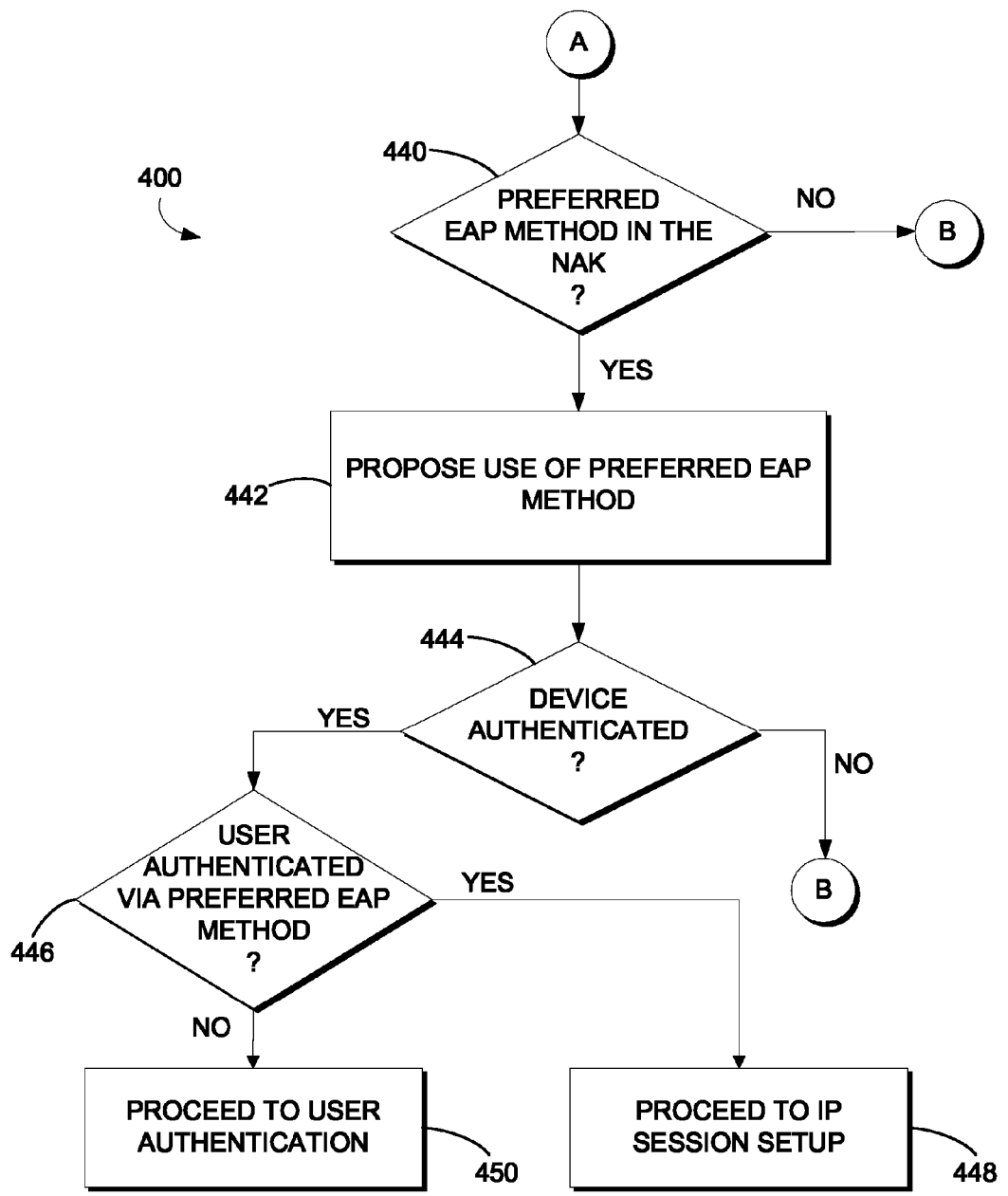
Figure 4C:
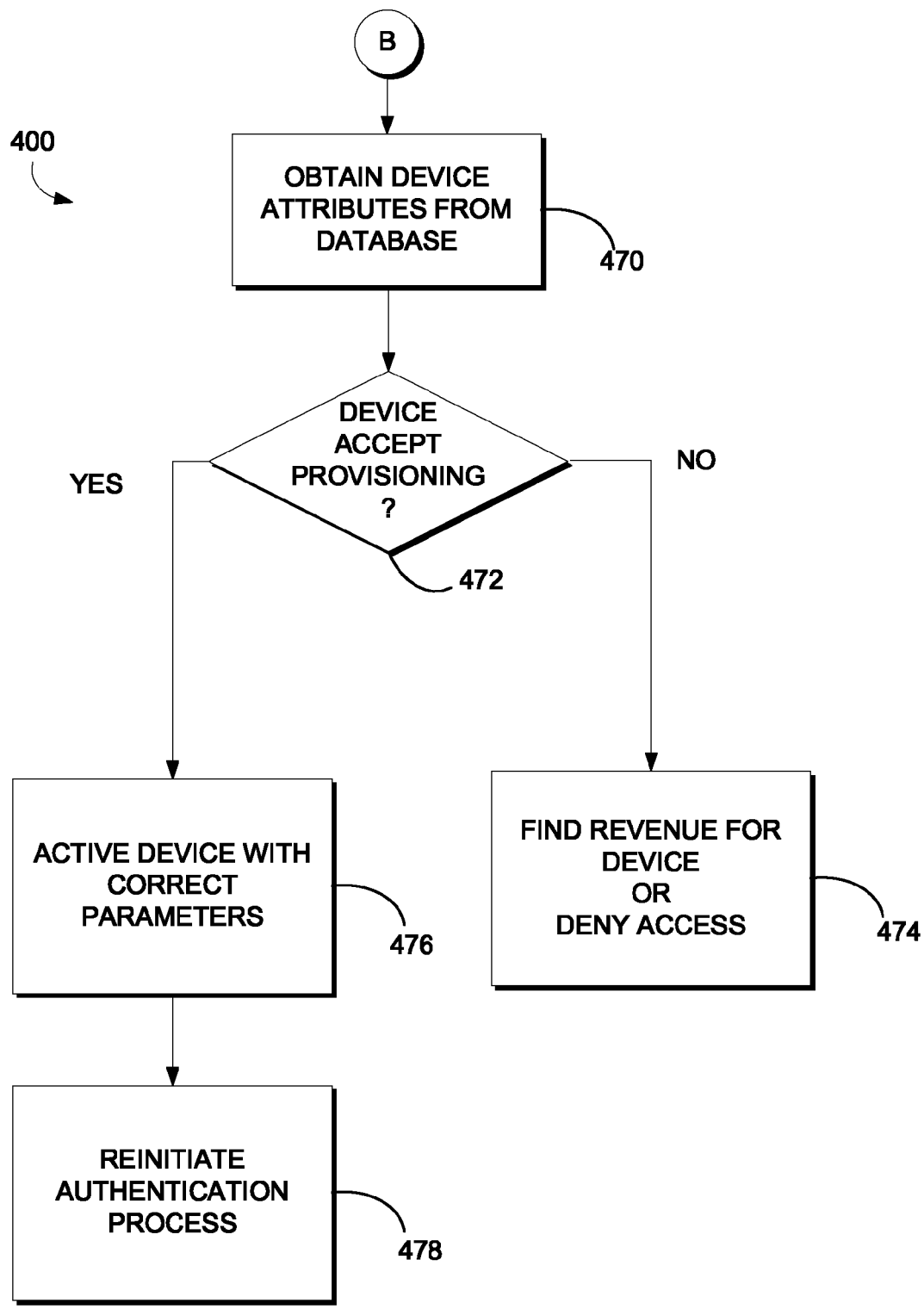

FIGS. 4A-4C illustrate a method 400 in accordance with one embodiment of the present invention for handling authentication of a device. At a step 402, a preferred EAP method is proposed to the device. If a negative acknowledgement ("a NAK") is received at a step 404, the method 400 proceeds to a reference numeral "A" on FIG. 4B. Otherwise, the device attempts to authenticate using the proposed EAP method at a step 406. If this authentication succeeds, the method 400 allows the authentication process to proceed to user authentication at a step 408.

In the event the device fails to authenticate at the step 406, device attributes are obtained from a database at a step 410. As previously mentioned, a global registry of devices may be maintained, and this registry may allow various device capability parameters to be obtained using the device's ID or MAC address. At a step 412, the method 400 determines whether the device has credentials. If not, the method proceeds to a reference numeral "B" on FIG. 4C.

At a step 414, it is determined whether the hardware address matches the credentials. If there is a mismatch, this indicates fraud, and a fraud alert is signaled at a step 416. As known to those skilled in the art, any number of measures may be taken in the event of detected fraud. To this end, the method 400 blacklists the device's MAC address at a step 418 and denies it network access.

If the hardware address matches the credentials, the device's credentials are used to propose device authentication at a step 420. The method 400, at a step 422, determines whether or not this authenticated was successful. If so, the device is allowed to proceed to user authentication at a step 424. In the case of failure, the method 400 proceeds to the reference numeral "B" on FIG. 4C.

FIG. 4B illustrates the steps of the method 400 that are performed when the device does not support the EAP method initially proposed by the network. At a step 440, it is determined whether a different preferred EAP method was proposed in the NAK. If not, the method 400 proceeds to the reference numeral "B" on FIG. 4C. If an EAP method was present in the NAK, the method 400, at a step 442, proposes the use of this EAP method for device authentication. At a step 444, it is determined whether authentication using the proposed EAP method succeeded. In the event of failure, the method 400 proceeds to the reference numeral "B" on FIG. 4C. Otherwise, upon a successful authentication, the method 400, at a step 446, determines whether the user was authenticated via the preferred EAP method. Depending on this determination, the authentication either proceeds to IP session setup at a step 448 or to user authentication at a step 450.

Turning to FIG. 4C, devices attributes are obtained from a database (e.g., a global registry of devices) at a step 470. For example, these attributes may indicate whether the device is capable of accepting X.509 certificate provisioning and/or EAP provisioning. At a step 472, the method 400 determines whether the device accepts provisioning. If not, the method 400, at a step 474, either finds a source of revenue to be associated with the device's network usage or denies network access to the device.

If it is determined that the device can accept provisioning, the device is activated with the correct parameters at a step 476. In one embodiment, this activation entails attempting to setup a user account for the device, provisioning the device to perform a normalized EAP method and/or pushing an X.509 certificate to the device. As will be appreciated by those skilled in the art, a provisionable device may be configured to allow successfully authentication via a standard authentication process. To this end, the device is directed to reinitiate the standard authentication process at a step 478. Using its newly-provided parameters, the device may likely pass the standard process.

Figure 5A:
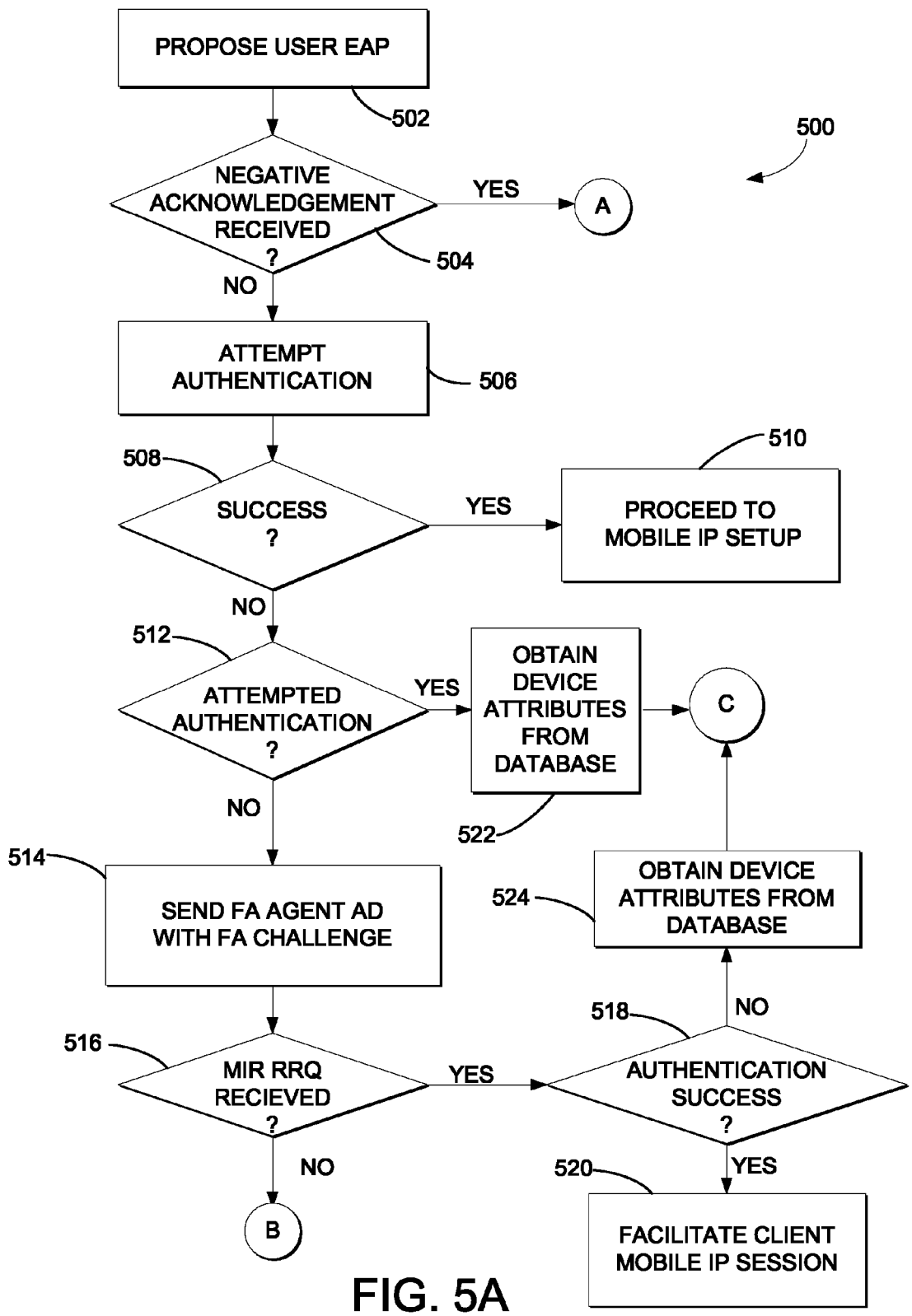
FIGS. 5A-5C illustrate a method in accordance with one embodiment of the present invention for handling the authentication of a user.
Figure 5B:
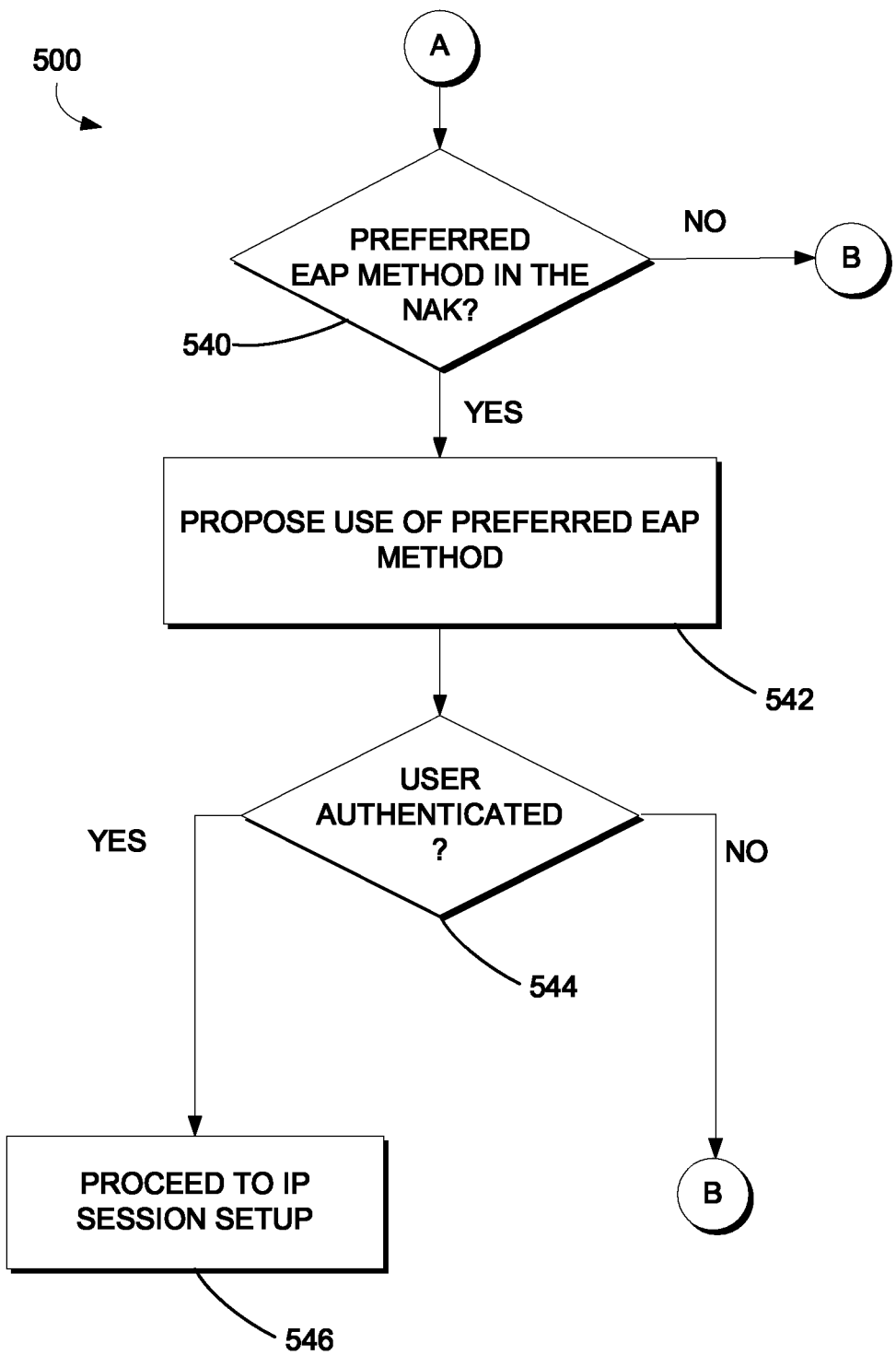
Figure 5C:
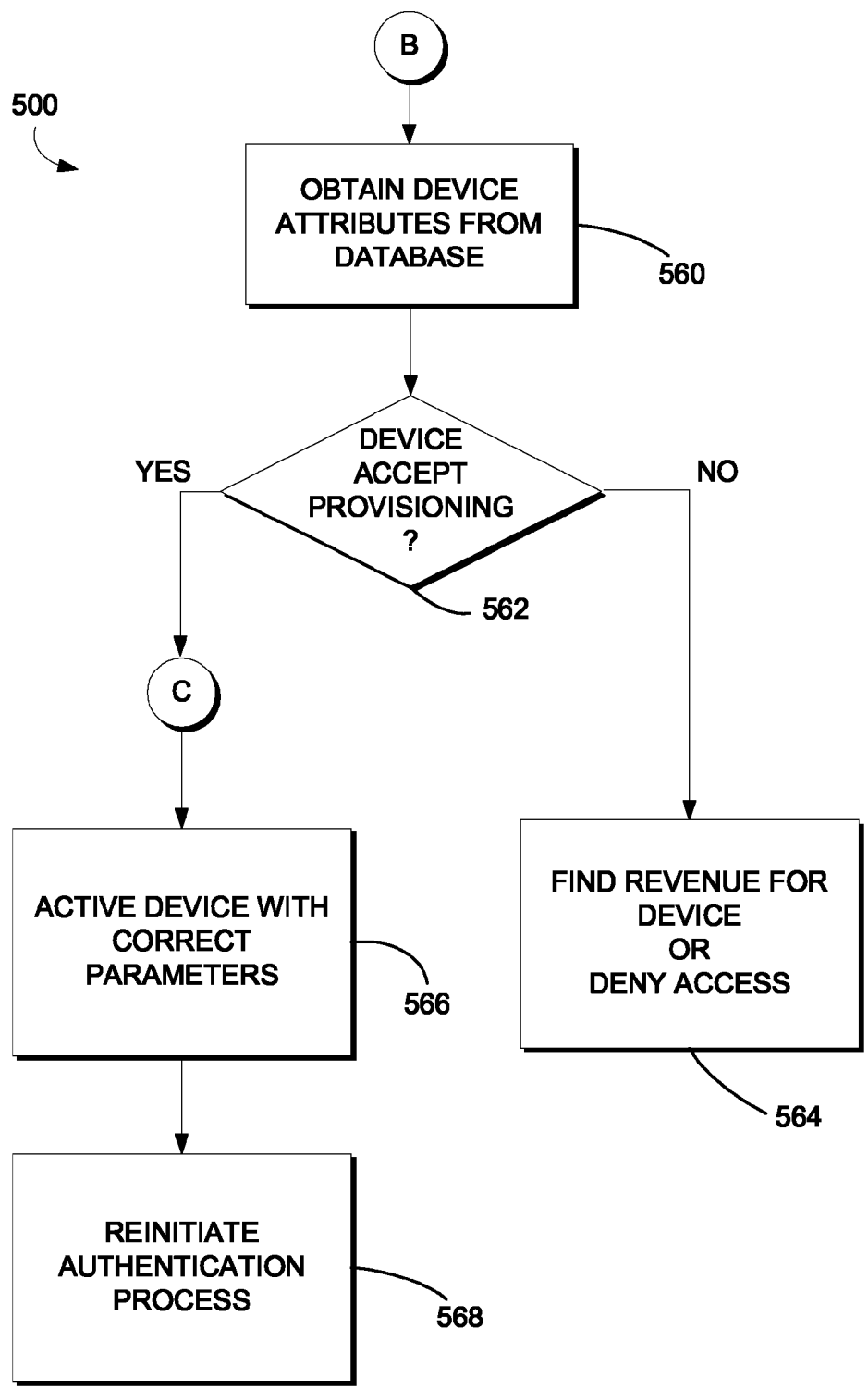

FIGS. 5A-5C illustrate a method 500 in accordance with one embodiment of the present invention for handling authentication of a user. At a step 502, a preferred user EAP method is proposed to the device. If a NAK is received at a step 504, the method 500 proceeds to a reference numeral "A" on FIG. 5B. Otherwise, user authentication using the proposed EAP method is attempted at a step 506. The method 500 determines whether this authentication succeeded at a step 508. If so, the method 500 allows the authentication process to proceed to Mobile IP setup at a step 510.

In the event that the user authentication failed at the step 508, it is determined, at a step 512, whether the authentication was even attempted. If there was no attempted authentication, the method 500 sends a Foreign Agent (FA) advertisement with an FA challenge. As known to those in the art, the FA is configured to issue a router advertisement, which includes an FA challenge. The mobile device extracts the challenge from the advertisement and computes a response. This response may be in the form of a Mobile IP Registration Request (MIP RRQ). As such, it is determined at a step 516 whether a MIP RRQ was received in response to the FA advertisement. If not, the method 500 proceeds to a reference numeral "B" on FIG. 5C. Alternately, when a MIP RRQ is received, the method 500 determines whether the user was successfully authenticated at a step 518. If so, the method 500 facilitates initiation of a Mobile IP session at a step 520.

In the event that the user failed to be authenticated at the step 518, device attributes are obtained from a database at a step 524. Similarly, in the event that no user authentication was attempted at the step 512, the device attributes are obtained from a database at a step 522. In both cases, the method 500 proceeds to a reference numeral "C" on FIG. 5C.

FIG. 5B illustrates the steps of the method 500 that are performed when the user device does not support the user EAP method initially proposed by the network. At a step 540, it is determined whether a different preferred EAP method was proposed in the NAK. If not, the method 500 proceeds to the reference numeral "B" on FIG. 5C. If an EAP method was present in the NAK, the method 500 proposes the use of this EAP for user authentication at a step 542. At a step 544, it is determined whether user authentication using the proposed EAP method succeeded. In the event of failure, the method 500 proceeds to the reference numeral "B" on FIG. 5C. Upon a successful authentication, however, the method 500, at a step 546, proceeds to IP session setup at a step 546.

Turning to FIG. 5C, devices attributes are obtained from a database (e.g., the global registry of devices) at a step 560. At a step 562, the method 500 determines whether the device accepts provisioning. If not, the method 500, at a step 564, either finds a source of revenue to be associated with the device's network usage or denies network access to the device. If it is determined that the device can accept provisioning, the device is activated with the correct parameters at a step 566. As previously mentioned, this activation may attempt to setup a user account for the device, to enable the device to perform a normalized EAP method and/or to push an X.509 certificate to the device. Finally, at a step 568, the device is directed to reinitiate the standard authentication process using the correct parameters.

Figure 6:
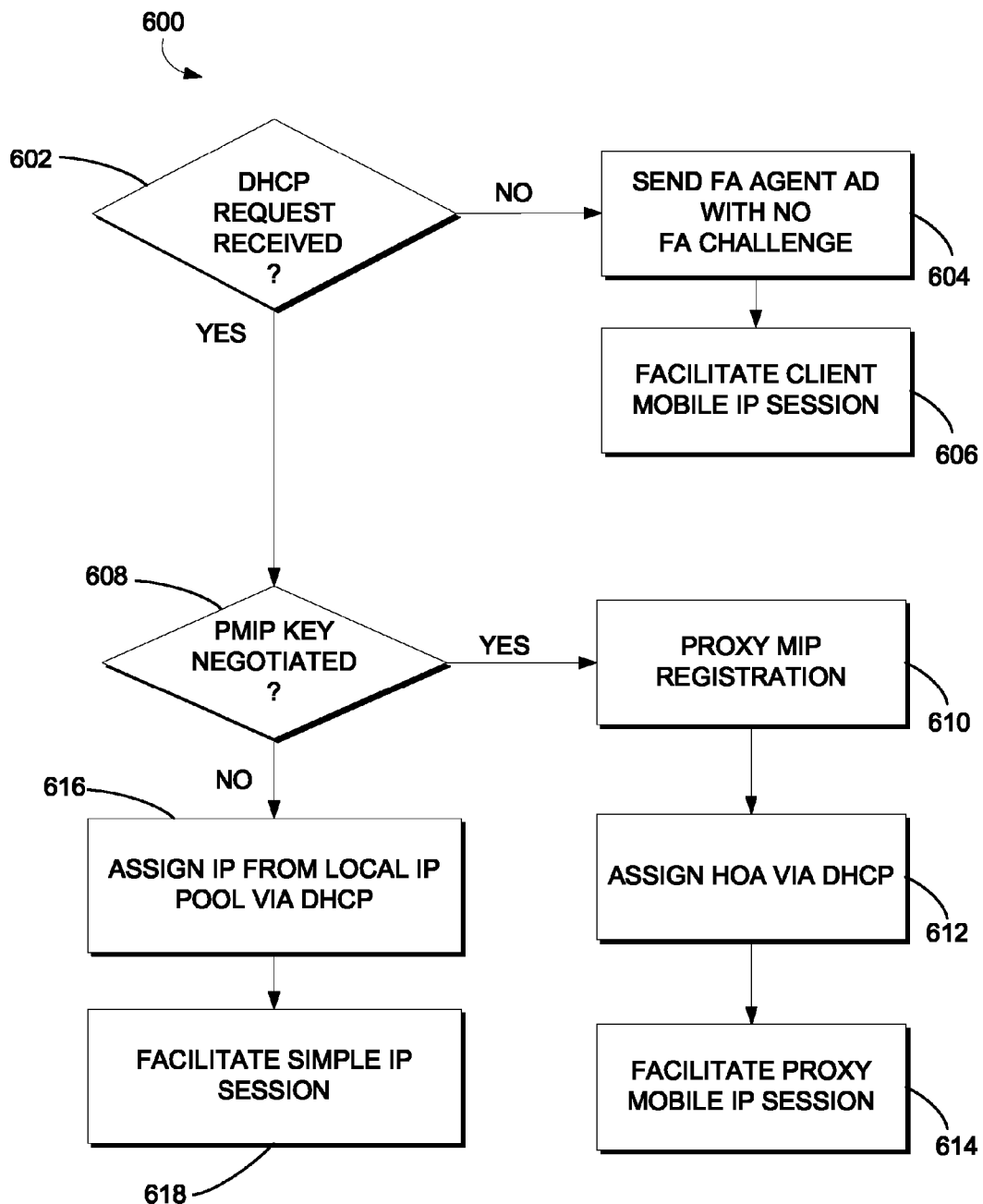
FIG. 6 illustrates a method in accordance with one embodiment of the present invention for facilitating initiation of an IP session.

FIG. 6 illustrates a method 600 in accordance with one embodiment of the present invention for facilitating initiation of an IP session. At a step 602, it is determined whether a Dynamic Host Configuration Protocol (DHCP) request was received. As known to those in the art, DHCP is an Internet protocol for automating the configuration of computers that use TCP/IP. If no request was received at the step 602, an FA advertisement is sent at a step 604 without an FA challenge. Subsequently, the method 600 facilitates initiation of a Mobile IP session at a step 606.

In the event that a DHCP request was received at the step 602, it is determined at a step 608 whether a Proxy Mobile IP (PMIP) key was successfully negotiated. If so, a proxy is used for the Mobile IP registration at a step 610. At a step 612, a home address (HoA) is assigned to the device via DHCP, and the method 600 facilitates initiation of a Proxy Mobile IP session at a step 614. In the event that a PMIP key was not negotiated at the step 608, an IP address is assigned to the device from the locate IP pool via DHCP at a step 616. Then, the method 600 facilitates a Simple IP session at a step 618.

Figure 7:
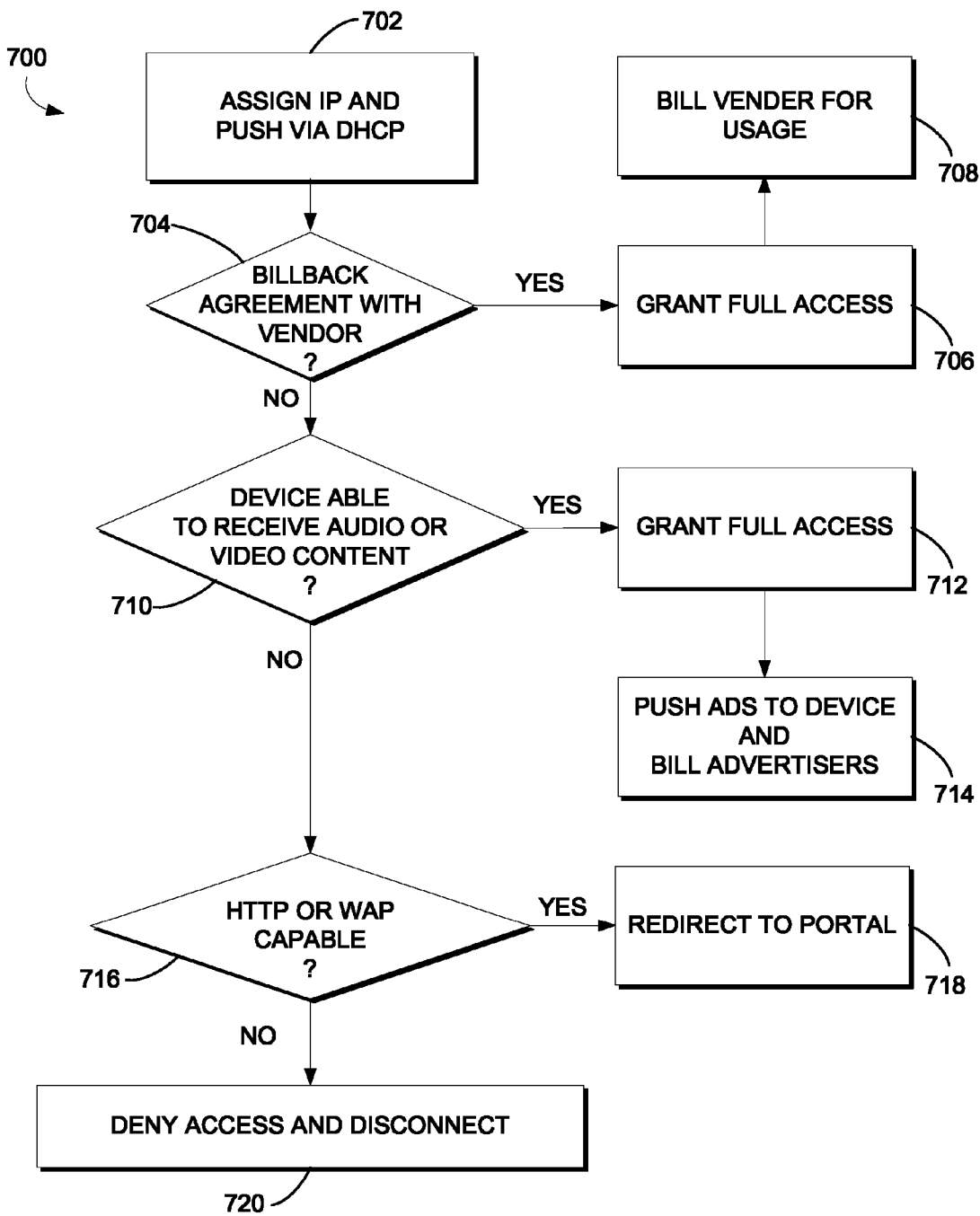
FIG. 7 illustrates a method in accordance with one embodiment of the present invention for finding a revenue source to be billed for a device's network usage.

FIG. 7 illustrates a method 700 in accordance with one embodiment of the present invention for finding a revenue source to be billed for a device's network usage. At a step 702, the device is assigned an IP address, which is pushed via DHCP. At a step 704, it is determined whether there exists a bill-back agreement with a device vender. For example, the vender and the network provider may have a contract in which the vender agrees to pay for usage associated with their devices. If such an agreement is in place, the method 700 grants the device full network access at a step 706. At a step 708, the vender is billed for the usage.

In the absence of a bill-back agreement, the method 700, at a step 710, determines whether the device is able to receive audio and/or video content. If so, the device is granted full network access at a step 712. Subsequently, advertisements may be pushed to the device at a step 714. Thereafter, advertisers will be billed for the network usage associated with the user's session.

If the device cannot receive audio or video, it is determined to a step 716 whether the device is HTTP or WAP capable. If so, the device is directed to a provisioning portal at a step 718. For example, the user may be presented a web page in which a credit card number may be entered to pay for any network usage. In this example, usage charges may be applied to the user's credit card at the end of the session.

If the device is not HTTP or WAP capable, the method 700 proceeds to the step 720. While the method 700 evaluates a number of potential revenue sources, network access is denied at the step 720 in the absence of an identified revenues source, and the device is disconnected from the network.

Figure 8:
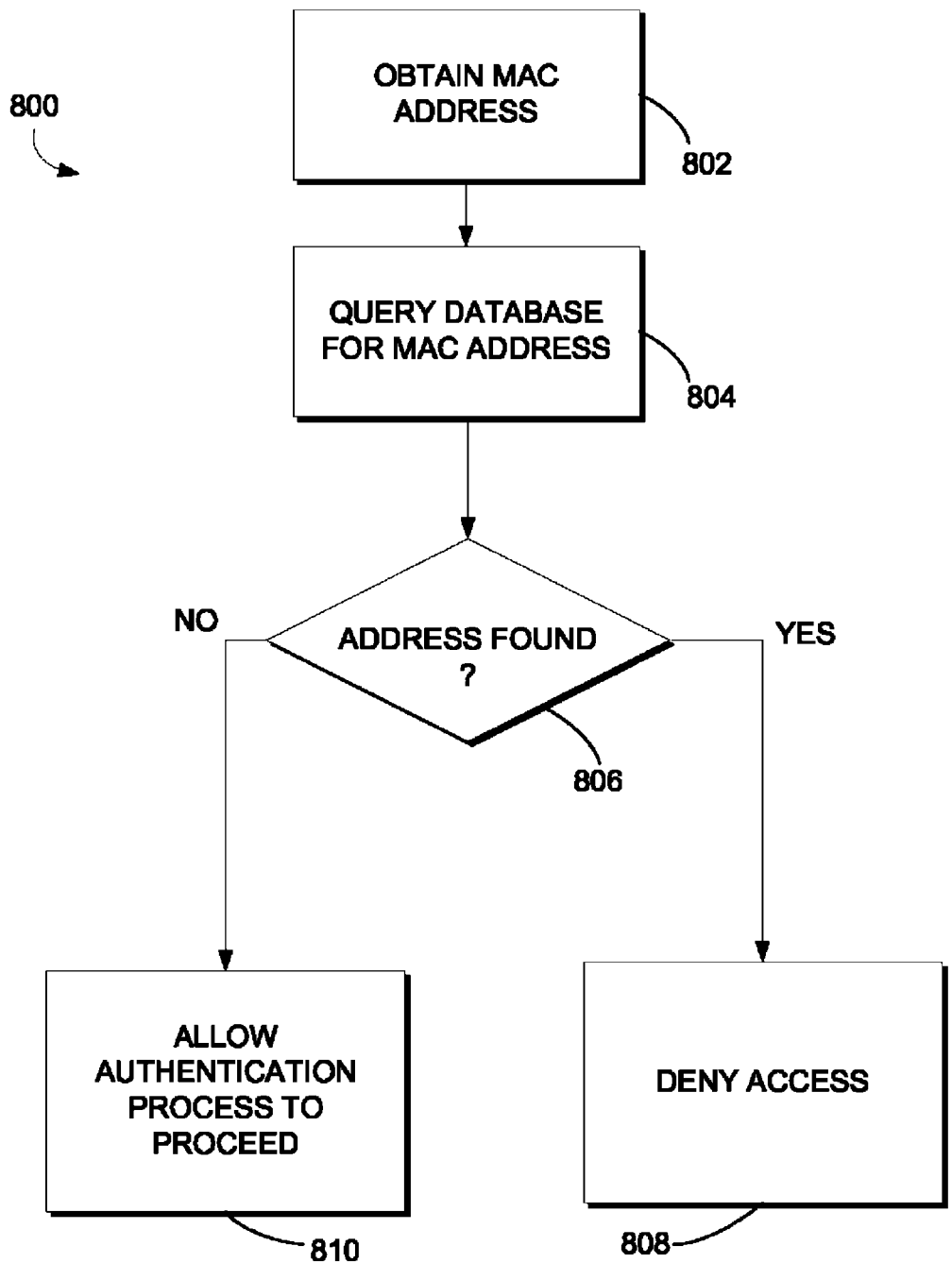
FIG. 8 illustrates a method in accordance with one embodiment of the present invention for validating a MAC address.

FIG. 8 illustrates a method 800 in accordance with one embodiment of the present invention for validating a MAC address. For example, a network provider may wish to validate a device's MAC address at the beginning of the authentication process. At a step 802, the MAC address is obtained from the device. This MAC address may then be used in the querying of a database. In one embodiment, a database of blacklisted MAC addresses may be maintained, and MAC addresses may be blacklisted for fraud or previous failed authentications attempts. By maintaining a database of such addresses, the method 800 may quickly recognize devices that should not be granted network access.

At a step 806, it is determined whether the device's MAC address was found in the database. If so, the device is denied access, and the authentication process terminates at a step 808. Alternately, when there is no record of the MAC address in the database, the authentication process is allowed to proceed at a step 810.

Alternative embodiments and implementations of the present invention will become apparent to those skilled in the art to which it pertains upon review of the specification, including the drawing figures. Accordingly, the scope of the present invention is defined by the appended claims rather than the foregoing description.

The invention claimed is:

1. A computer-implemented method for handling a device that experiences a failure to complete an authentication process of a network, the method comprising:
    detecting a failure to complete a first authentication process by a device while attempting to establish a session over said network, wherein the first authentication process includes receiving a Media Access Control (MAC) address from the device;
    determining one or more causes of said failure to authenticate said device to said network when utilizing said first authentication process;
    analyzing at least a portion of said one or more causes of said authentication failure to select an alternative authentication process from a set of several alternative authentication processes, wherein said alternative authentication process is different from said first authentication process;
    when a cause of said authentication failure includes a determination that said MAC address is invalid or unauthorized, then determining whether said device has a device identifier;
    when said device has said device identifier, then attempting to authenticate said device to said network by utilizing said device identifier along with said alternative authentication process;
    when said device does not have said device identifier, then obtaining device attributes associated with said device from a database based on the MAC address received from said device, wherein said data base is a global registry of devices;
    based on the device attributes, determining whether the device is capable of being provisioned with a new device identifier;
    when the device is capable of being provisioned with the new device identifier, then provisioning the device, wherein said provisioning includes
        (A) negotiating, with at least one remote device, activation parameters to be used during said alternative authentication process, and
        (B) communicating said activation parameters to said device, wherein said activation parameters are to be used during said alternative authentication process and are stored on said device, wherein said negotiating and said communicating of said activation parameters do not rely on information provided by the user as part of the first authentication process or as part of the alternative authentication process, and
        (C) upon successfully provisioning said device, re-attempting to authenticate said device to said network by using the new device identifier along with said alternative authentication process; and
    incident to success of said alternative authentication process, allowing said device to establish a session over said network.

2. The method of claim 1, further comprising receiving from said device information indicating one or more authentication methods supported by said device.

3. The method of claim 2, wherein said alternative authentication process incorporates at least a portion of said one or more authentication methods.

4. The method of claim 1, wherein said device is a mobile communications device, and wherein said network is a wireless network.

5. The method of claim 4, wherein said network is a WiMax network.

6. One or more computer-readable non-transitory storage media having computer-useable instructions embodied thereon to perform a method for handling devices that experience a failure to complete an authentication process of a network, the method comprising:
    detecting a failure to complete a first authentication process by a device while attempting to establish a session over said network;
    determining one or more causes of said failure to authenticate said device;
    analyzing at least a portion of said one or more causes to select an alternative authentication process, wherein said alternative authentication process requires different authentication parameters than said first authentication process;

utilizing a device identifier received from said device to search a global device registry for device capabilities associated with said device;

utilizing one or more device capabilities received from said global device registry to determine whether said device is capable of being provisioned with one or more authentication parameters;

when said device is capable of being provisioned, then providing at least a portion of said one or more authentication parameters to said device, wherein said providing of said one or more activation parameters does not rely on information provided by the user as part of the first authentication process or as part of the alternative authentication process;

re-attempting to authenticate said device to said network by using said alternative authentication process, wherein said re-attempting includes using said one or more authentication parameters; and incident to authentication failures by both said authentication process and said alternative authentication process, engaging in interactions with a user to determine further information that may be used to authenticate the device to the network or to identify one or more entities to be billed for network usage associated with the device.

7. The media of claim 6, wherein said method further comprises granting network access to said one or more of the devices that are not capable of being provisioned.

8. The media of claim 6, wherein said method further comprises directing said portion of the devices identified as capable of being provisioned to reattempt said authentication process.

9. The media of claim 6, wherein said devices are mobile communications devices, and wherein said network is a wireless network.

10. The media of claim 6, wherein said method further comprises denying network access to at least a portion of the devices that are not capable of being provisioned.

* * * * *